United States Patent [19]

Aoki et al.

[11] Patent Number: 4,644,338
[45] Date of Patent: Feb. 17, 1987

[54] DOT-MATRIX LIQUID CRYSTAL DISPLAY

[75] Inventors: Shigeo Aoki, Habikino; Junichi Tamamura; Yasuhiro Ukai, both of Yao, all of Japan

[73] Assignee: Hosiden Electronics Co., Ltd., Osaka, Japan

[21] Appl. No.: 510,481

[22] Filed: Jul. 1, 1983

[30] Foreign Application Priority Data

Jul. 12, 1982 [JP] Japan .................. 57-120808

[51] Int. Cl.$^4$ ............................. G09G 3/36
[52] U.S. Cl. .................... 340/719; 340/702; 340/784
[58] Field of Search ............. 340/717, 718, 719, 784, 340/701, 703, 702; 350/331 R, 332, 333, 339 R, 343; 29/571, 577

[56] References Cited

U.S. PATENT DOCUMENTS

| | | | |
|---|---|---|---|
| 4,103,297 | 7/1978 | McGreivy et al. | 340/719 |
| 4,112,333 | 9/1978 | Asars et al. | 340/784 |
| 4,156,833 | 5/1979 | Wey et al. | 340/719 |
| 4,239,346 | 12/1980 | Lloyd | 340/719 |
| 4,245,168 | 1/1981 | Waldron | 340/784 |
| 4,325,073 | 4/1982 | Hughes et al. | 29/571 |
| 4,345,248 | 8/1982 | Togashi et al. | 340/784 |
| 4,345,249 | 8/1982 | Togashi | 340/784 |
| 4,364,168 | 12/1982 | Matsuyama et al. | 350/343 |
| 4,385,292 | 5/1983 | Nonomura et al. | 340/784 |
| 4,410,887 | 10/1983 | Stolov et al. | 340/701 |
| 4,481,707 | 11/1984 | Cunniff | 29/571 |

OTHER PUBLICATIONS

"Amorphous Silicon Enlarges LCDs", Electronics, May 19, 1982, pp. 94, 96.
"A Thin-Film-Transistor-Controlled Liquid-Crystal Numeric Display", by Erskine et al, IEEE Trans. Electron Devices, vol. ED-26, pp. 802-806, May 1979.
"A Liquid Crystal Multicolor Display Using Color Filters" by T. Uchida, Proc. Euro-Display, Sep. 1981, pp. 39-42.

Primary Examiner—Marshall M. Curtis
Attorney, Agent, or Firm—Pollock, VandeSande and Priddy

[57] ABSTRACT

A liquid crystal cell comprises a liquid crystal sealed between a pair of confronting transparent substrates. A multiplicity of semiconductor driver elements are substantially uniformly distributed over an inner surface of one of the substrates. The semiconductor driver elements have output electrodes connected respectively to matrix element electrodes formed on the inner surface of said one of the substrates. A driver circuit is formed as a semiconductor integrated circuit on an extension of the inner surface of said one of the substrates for selectively driving the semiconductor driver elements.

12 Claims, 26 Drawing Figures

DOT-MATRIX LIQUID CRYSTAL DISPLAY

BACKGROUND OF THE INVENTION

The present invention relates to a dot-matrix liquid crystal display system having a liquid crystal cell containing a multiplicity of matrix elements selectively drivable for displaying a variety of patterns such as characters, graphical images or the like.

There have heretofore been proposed dot-matrix liquid crystal displays including thin-film transistors assembled as drivers into a small-size liquid crystal cell for selectively driving matrix elements. To energize such transistors, a multiplicity of terminals are drawn out of the liquid crystal cell. It is quite tedious and time-consuming to connect such terminals to a driver circuit. More specifically, a dot-matrix color liquid crystal display has matrix elements each composed of three dots of red, blue and green which are to be selectively driven. The number of terminals connected to such a color liquid crystal display is much greater than that of a single-color or black-and-white liquid color display. In case the number of matrix elements is $100 \times 100 = 10,000$, for example, the number of terminals extending from a single-color liquid crystal cell is $100 + 100 = 200$, while the number of terminals from a color liquid crystal cell is $100 + 3 \times 100 = 400$ as the number of dots required is $100 \times 100 \times 3 = 30,000$. The procedure for connecting such terminals to the driver circuit is quite complex.

Thin-film transistors are assembled in conventional liquid crystal cells as follows: Gate and matrix element electrodes are directly formed on an inner surface of a substrate of the liquid crystal cell, and a gate insulation film is deposited all over the inner surface of the substrate including these electrodes. A semiconductor layer is formed on the gate insulation film in confronting relation to the gate electrodes. Drain and source electrodes are deposited on the semiconductor layer in partially overlapping relation to opposite sides of the gate electrodes with the semiconductor layer and the gate insulation film interposed therebetween. For electric connection of the drain electrodes to the matrix element electrodes, it has been necessary to form holes through the gate insulation film for providing contact between the electrodes. It has also been necessary to deposit a protective film on the thin-film transistors in order to prevent the latter from being exposed to the atmosphere which would degrade the surface semiconductor layer before the thin-film transistors are sealed in the liquid crystal cell. Accordingly, the process of fabricating thin-film transistors in prior liquid crystal cells has necessitated an increased number of steps due to the step of defining contact holes and the step of depositing a protective film. With liquid crystal cells of a large display area, many thin-film transistors have to be fabricated in the liquid crystal cell. The larger the number of fabrication steps, the greater the difficulty in fabricating thin-film transistors of uniform characteristics, and it is more difficult to render all of the produced thin-film transistors free from defects.

SUMMARY OF THE INVENTION

It is an object of the present invention to provide a dot-matrix liquid crystal display having fewer terminals for external connection.

Another object of the present invention is to provide a dot-matrix liquid crystal display which can be fabricated in a reduced number of steps and with an increased yield, and can a wide display area.

Still another object of the present invention is to provide a dot-matrix liquid crystal display which has a small number of terminals for external connection, can be fabricated in a reduced number of steps, and can a large area of display.

According to the present invention, a multiplicity of thin-film transistors are closely distributed on a surface of a substrate in a liquid crystal cell, the transistors constituting part of dot-matrix display elements and having output electrodes or drain electrodes connected to matrix elements. In a color liquid crystal display, color filters are formed on the matrix elements or another substrate in confronting relation to the matrix elements. These color filters have at least two colors, and a set of adjacent ones of the color filters constitutes a single matrix element. A driver circuit for selectively driving the thin-film transistors has at least its portion formed as a semiconductor integrated circuit on the substrate on which the thin-film transistors are mounted. The dot-matrix liquid crystal display is connected to external terminals through terminals of the driver circuit, with the result that the number of terminals of external connection can be reduced for facilitating such external connection. The color filters should preferably be formed of color ink that can be formed by a printing process. Further according to the present invention, the thin-film transistors in the liquid crystal cell has drain and source electrodes formed on the inner surface of the substrate. A semiconductor layer is formed between the drain and source electrodes, and covered by a gate insulation film. Gate electrodes are formed on the gate insulation film. With the drain electrodes formed on the inner substrate surface, the drain electrodes and the matrix element electrodes can be simultaneously formed in interconnected condition. There is no need for a fabrication step of defining contact holes for connecting these electrodes. Since the semiconductor layer is fully covered with the gate insulation film, it is not necessary to form a protective film on the semiconductor layer.

The above and other objects, features and advantages of the present invention will become more apparent from the following description when taken in conjunction with the accompanying drawings in which preferred embodiments of the present invention are shown by way of illustrative example.

DESCRIPTION OF THE DRAWINGS

FIGS. 11A, 11B, 11 C, 11D, 11E, 11F and 11G are a timing chart showing operations of the driver circuit of FIG. 10;

DETAILED DESCRIPTION

Prior to describing embodiments of the present invention, a conventional dot-matrix liquid crystal display will first be described with reference to FIGS. 1 and 2.

Figure 1:
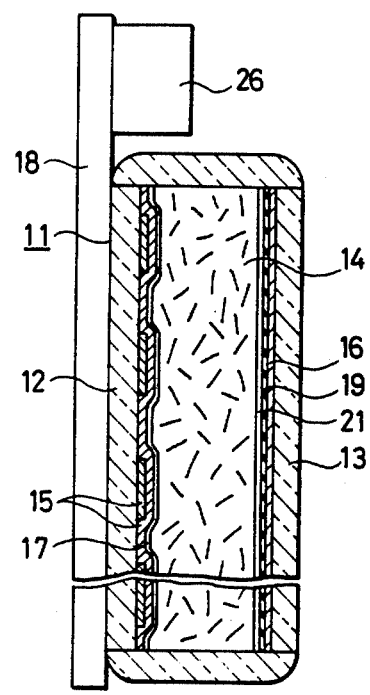
FIG. 1 is a cross-sectional view of a conventional dot-matrix liquid crystal display.

As shown in FIG. 1, a liquid crystal cell 11 has a pair of transparent substrates 12, 13 in the form of plates of glass positioned closely in confronting relationship, and a liquid crystal 14 interposed and sealed between the transparent substrates 12, 13. An array 15 of thin-film transistors is formed on an inner surface of one of the transparent substrates 12, and a transparent common electrode 16 is deposited substantially fully over an inner surface of the other transparent substrate 13. An orientation treatment layer 17 is deposited on the array 15 of thin-film transistors, and another orientation treatment layer 21 is deposited on the common electrode 16 with an insulation film 19 interposed therebetween.

Figure 2:
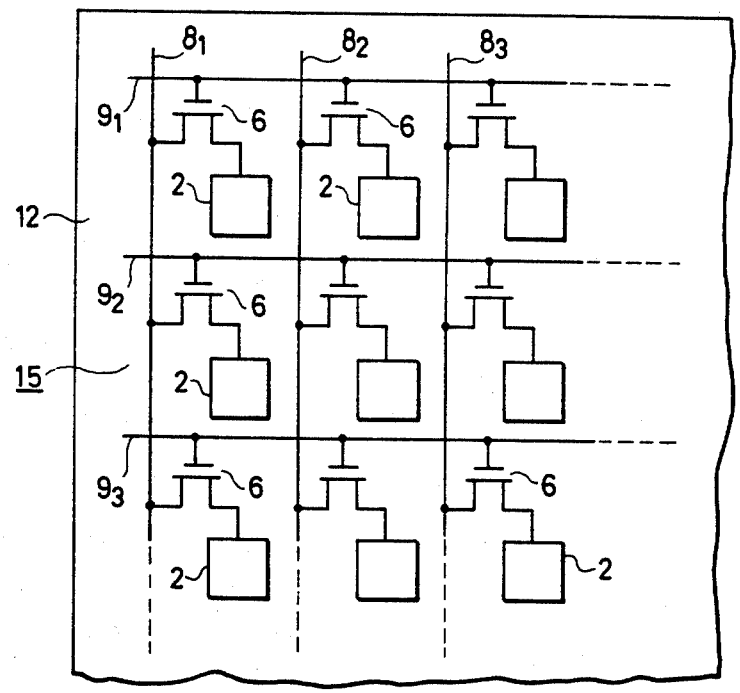
FIG. 2 is a diagram of a prior art transistor circuit for driving matrix elements in a dot-matrix liquid crystal display.

As shown in FIG. 2, the array 15 of thin-film transistors is composed of column lines $8_1, 8_2, 8_3, \ldots$ extending substantially parallel to each other at transversely equally spaced intervals, and row lines $9_1, 9_2, 9_3, \ldots$ extending substantially parallel to each other at transversely equally spaced intervals in substantially perpendicular relationship to the column lines. Thin-film transistors 6 are provided respectively at positions where the column and row lines intersect. Each of the transistors 6 has a gate connected to the row line 9 and a source connected to the column line 8. Each of the rectangular frames or spaces defined by the row and column lines is substantially filled with a matrix element electrode (drain electrode) 2 to which a drain of a corresponding one of the transistors 6 is joined.

A voltage is applied between a selected one of the column lines $8_1, 8_2, 8_3, \ldots$ and a selected one of the row lines $9_1, 9_2, 9_3, \ldots$ to energize the transistor 6 at the position where the selected column and row lines intersect. The voltage is then impressed across the matrix element electrode 2 of the energized transistor 6 and the common electrode 16 for thereby causing the matrix element electrode 2 to display an appearance different from the rest of the liquid crystal cell 11. All of the matrix elements in the liquid crystal cell 11 can selectively be displayed in this manner.

With this prior art arrangement, a column driver circuit 26 (FIG. 1) for the column lines $8_1, 8_2, 8_3, \ldots$ and a row driver circuit (not shown) for the row lines $9_1, 9_2, 9_3, \ldots$ are mounted on a wiring base plate 18 on which the liquid crystal cell 11 is supported. The column lines $8_1, 8_2, 8_3, \ldots$ and the row lines $9_1, 9_2, 9_3, \ldots$ have respective terminals connected to corresponding terminals of the column driver circuit 26 and the row driver circuit. Where the number of matrix elements is $100 \times 100 = 10,000$, the number of terminals to be connected to the driver circuits is as many as $100 + 100 = 200$, and it is a tedious undertaking to connect the liquid crystal cell terminals to the driver circuits. With a color display liquid crystal cell, in particular, each matrix element is generally composed of three dots of red, green and blue which are independently drivable. In case the matrix elements employed are as many as $100 \times 100 = 10,000$, the total number of dots is $100 \times 100 \times 3 = 30,000$, and the number of terminals required reaches $100 + 3 \times 100 = 400$. Such an increased number of terminals makes it more complex and time-consuming to couple the color display liquid crystal cell with the driver circuits.

Figure 3:
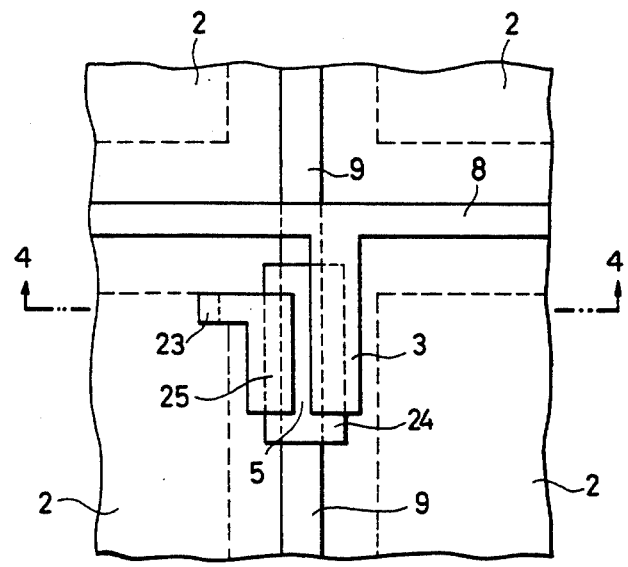
FIG. 3 is a fragmentary plan view of a thin-film transistor in a prior liquid crystal display.
Figure 4:
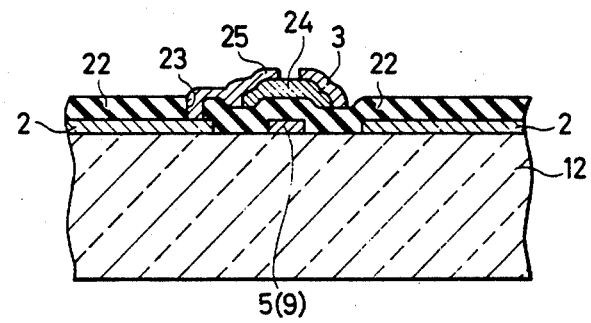
FIG. 4 is a cross-sectional view taken along line 4—4 of FIG. 3.

The prior thin-film transistor 6 has the construction as shown in FIGS. 3 and 4. Gate electrodes 5 (with row lines 9) are formed on a substrate 12 by first depositing a layer of metal such as chromium fully over the substrate 12 and then etching the metal layer into a prescribed pattern. Thereafter, matrix element electrodes (drain electrodes) 2 in the form of transparent metal films are formed on the substrate 12 similarly by the deposition of a metal layer over the substrate 12 followed by the selective etching of the metal layer. Then, a gate insulation film 22 of silicon nitride is deposited on the entire surface of the substrate 12, and holes 23 are defined in the gate insulation film 22 to provide contact with the matrix element electrodes 2. A semiconductor layer 24 of amorphous silicon is deposited over each of the gate electrodes 5 with the gate insulation film 22 interposed therebetween. Subsequently, a drain electrode 25 and a source electrode 3 (with a column line 8 connected therewith) are formed of aluminum on each semiconductor layer 24 in partially overlapping relation to opposite sides of the gate electrode 5 with the semiconductor layer 24 and the gate insulation film 22 interposed therebetween. The drain electrode 25 is joined to the matrix element electrode 2 through the contact hole 23.

The fabrication of the conventional thin-film transistor 6 has required a relatively large number of steps. It has therefore been difficult to fabricate a multiplicity of thin-film transistors 6 of defect-free uniform characteristics covering a wide display area. Since the semiconductor layer 24 has an exposed portion between the drain and source electrodes 25, 3, the exposed portion would contact moisture in the air thus degrading the characteristics of the transistor 6 after the transistor array 15 has been fabricated on the substrate 12 and before the assembly is constructed as the liquid crystal cell 11. To prevent this problem, it is necessary to form a protective film on the semiconductor layer 24 after the electrodes 25, 3 have been deposited, resulting in a process composed of more fabrication steps.

Figure 5:
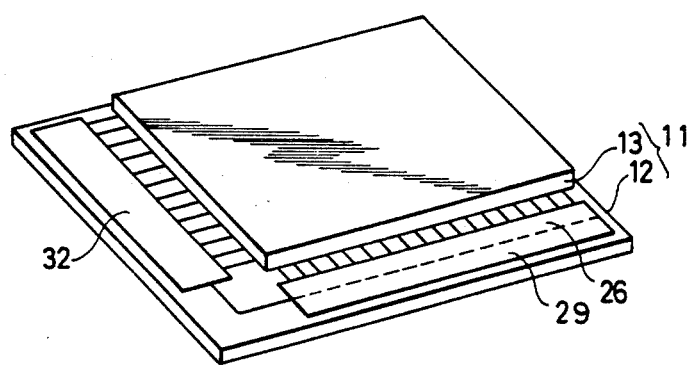
FIG. 5 is a perspective view of a dot-matrix liquid crystal display according to the present invention.

A color liquid crystal display incorporating the principles of a dot-matrix liquid crystal display according to the present invention will now be described. FIG. 5 shows an appearance of such a color liquid crystal display. The color liquid crystal display comprises a liquid crystal cell 12 composed of a pair of transparent substrates 12, 13 disposed in confronting relationship and a liquid crystal sealed between the substrates 12, 13. A multiplicity of color display elements are formed on a surface of one of the substrates in the liquid crystal cell 11.

Figure 6:
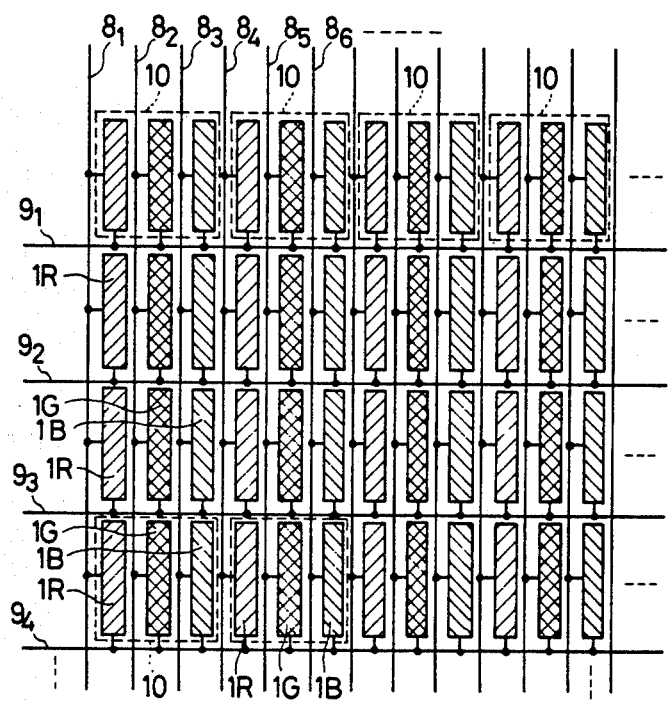
FIG. 6 is a diagram showing an arrangement of color display elements in the dot-matrix liquid crystal display illustrated in FIG. 5.

As shown in FIG. 6, such color display elements are grouped into three kinds; red display elements 1R, green display elements 1G, and blue display elements 1B which are substantially uniformly distributed over the substrate. In the illustrated embodiment, the color display elements are elongate and parallel to each other, and each group of three different color display matrix elements constitutes a substantially square region 10 which serves as a matrix element. The matrix elements 10 are arranged in columns and rows. To drive these matrix elements 10 through a simplified process, the red, green and blue display elements 1R, 1G, 1B are arrayed rectilinearly in longitudinal directions parallel to each other.

Figure 7:
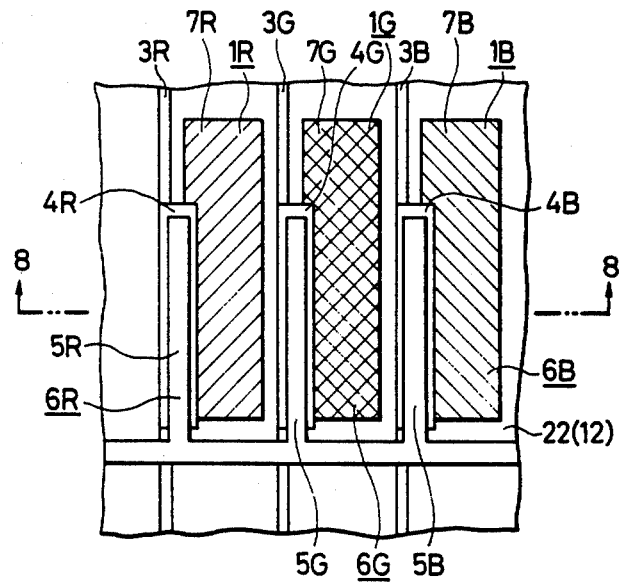
FIG. 7 is an enlarged fragmentary plan view of a portion of the arrangement of FIG. 6.
Figure 8:
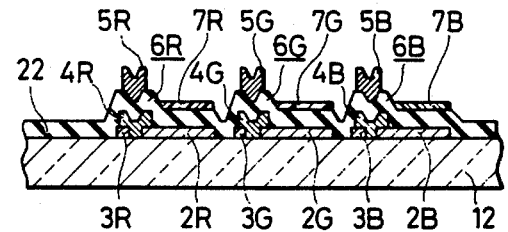
FIG. 8 is a cross-sectional view taken along line 8—8 of FIG. 7.

According to the present invention, each of the color display elements 1R, 1G, 1B is composed of a semiconductor driver or a thin-film transistor and a color filter on an output electrode thereof. More specifically, as shown in FIGS. 7 and 8, one of the substrates 12 of the liquid crystal cell 11 is in the form of a transparent glass plate. Rectangular drain electrodes (matrix element electrodes) 2R, 2G, 2B which are about as large as the color display elements are formed on the substrate 12, and narrower source electrodes 3R, 3G, 3B are deposited on the substrate 12 closely adjacent to the drain electrodes 2R, 2G, 2B, respectively, in parallel relationship. Films 4R, 4G, 4B of amorphous silicon are formed as semiconductor layers between the drain and source electrodes 2R, 3R, the drain and source electrodes 2G, 3G, and the drain and source electrodes 2B, 3B, respectively. A gate insulation film 22 of silicon nitride is formed over the electrodes and the substrate. Gate electrodes 5R, 5G, 5B are deposited on the gate insulation film 22 in confronting relation to the amorphous-silicon films 4R, 4G, 4B, respectively. The drain and source electrodes 2R, 2G, 2B and 3R, 3G, 3B should preferably be in the form of transparent electrodes of indium oxide or tin oxide. The gate electrodes 5R, 5G, 5B may be made of aluminum.

The source electrodes 3R, 3G, 3B, the drain electrodes (matrix element electrodes) 2R, 2G, 2B, the amorphous-silicon films 4R, 4G, 4B, the gate insulation film 22, and the gate electrodes 5R, 5G, 5B jointly constitute thin-film transistors 6R, 6G, 6B, respectively. On the thin-film transistors 6R, 6G, 6B, there are respectively formed red, green and blue color filters 7R, 7G, 7B over the drain electrodes (output electrodes) 2R, 2G, 2B, respectively, with the gate insulation film 22 interposed therebetween. The color filters 7R, 7G, 7B are formed as by a screen or offset printing process.

Figure 9:
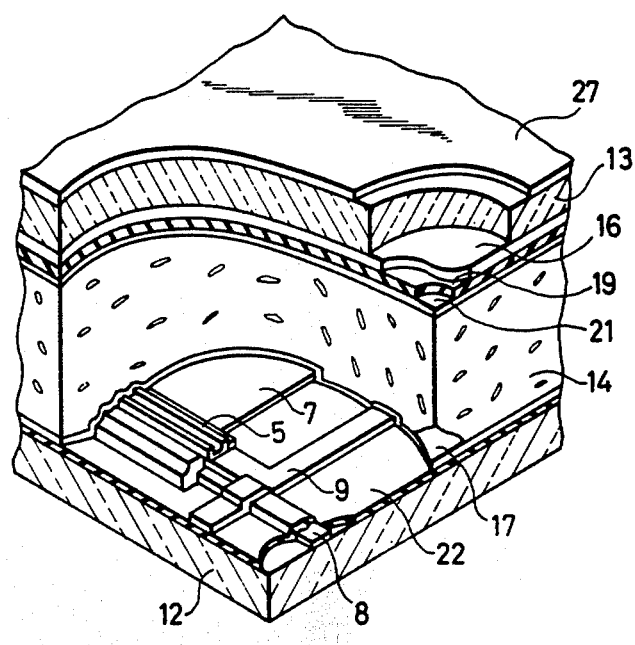
FIG. 9 is a fragmentary perspective view, partly cut away, of the dot-matrix liquid crystal display of the present invention.

As illustrated in FIG. 9, an orientation treatment layer 17 as of polyvinyl alcohol is deposited on the color display elements thus formed on the substrate 12. The substrate 13 which is disposed in confronting relationship to the substrate 12 is made of transparent glass, for example. A common transparent electrode 16 is formed on an entire inner surface of the substrate 13. An insulation film 19 such as of silicon nitride is formed on the common transparent electrode 16, and another orientation treatment layer 21 is deposited on the insulation film 19. A liquid crystal 14 is sealed between the orientation treatment layers 17, 21. The liquid crystal cell 11 of the foregoing construction constitutes a black guest-host liquid crystal cell or a black-and-white twisted nematic liquid crystal. A polarizer 27 is attached to an outer surface of the substrate 13.

As shown in FIG. 6, column lines $8_1$, $8_2$, $8_3$, ... are formed on the substrate 12 along the columns of the color display elements, and the source electrode 3R, 3G or 3B of an adjacent color display element is connected to each column line. Row lines $9_1$, $9_2$, $9_3$, ... are formed on the substrate 12 along the rows of the color display elements, and the gate electrode 5R, 5G or 5B of an adjacent color display element is connected to each row line.

Figure 10:
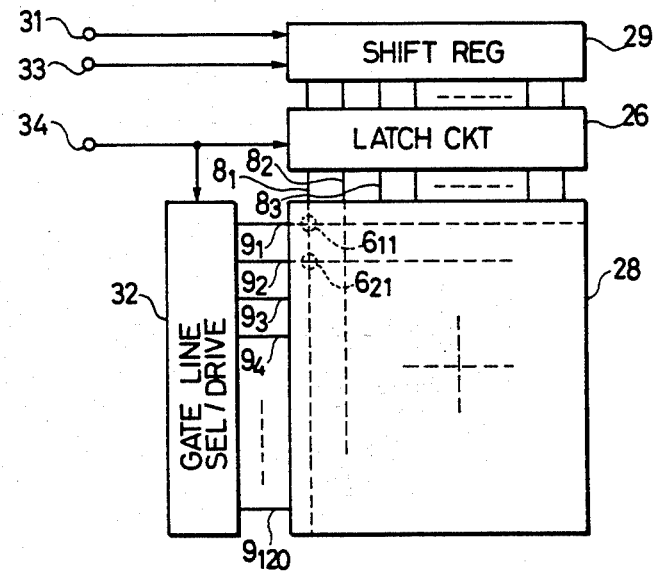
FIG. 10 is a block diagram of a driver circuit for the liquid crystal display.

The color display elements can selectively be driven by a driver circuit as shown in FIG. 10. The color display elements illustrated in FIG. 6 constitute a display plane 28 as shown in FIG. 10. The source lines $8_1$, $8_2$, $8_3$, ... and the gate lines $9_1$, $9_2$, $9_3$, ... have terminals led out of the display plane 28. The terminals of the source lines $8_1$, $8_2$, $8_3$, ... are connected respectively to corresponding outputs of bit positions of a latch circuit 26 serving as a column driver, the bit positions of the latch circuit 26 being connected to outputs of bit positions of a shift register 29. In operation, display data are supplied from a data terminal 31 as binary signals of "1" or "0" indicative of whether a row of color display elements are displayed or not. Such display data are successively fed serially into the shift register 29 in synchronism with a clock signal from a clock terminal 33. After one-row display data have thus been delivered, the data stored in the shift register 29 is latched in parallel into the latch circuit 26 in response to a latch command from a terminal 34.

The latch command from the terminal 34 is also applied to a gate line selector and driver circuit 32, which then successively selects the gate lines $9_1$, $9_2$, $9_3$, ... one at a time. When the gate line $9_1$, for example, is selected, the color display elements which are displayed or kept non-displayed are the elements which are positioned at the junctions between the gate line $9_1$ and those source lines $8_1$, $8_2$, $8_{33}$, ... to which output bits latched in the latch circuit 26 are applied. While the gate line $9_1$ is being selected for display, data for a next row line are fed into the shift register 29, and the stored data are then latched into the latch circuit 26 on a next latch command from the terminal 34. In response to this latch command, the gate line selector and driver circuit 32 selects the gate line $9_2$ for selective display of the color display elements connected to the gate line $9_2$. A detailed construction of the driver circuit comprising elements such as the shift register 29, latch circuit 26, and gate line selector 32 is disclosed in the short communication titled "Progress Toward TFT-addressed Flat-Panel Color Television" by A. G. Fischer in "Nonemissive Electrooptic Displays" A. R. Kmetz and F. K. von Willisen, 1976 Plenum Press New York, for example.

Figure 11:
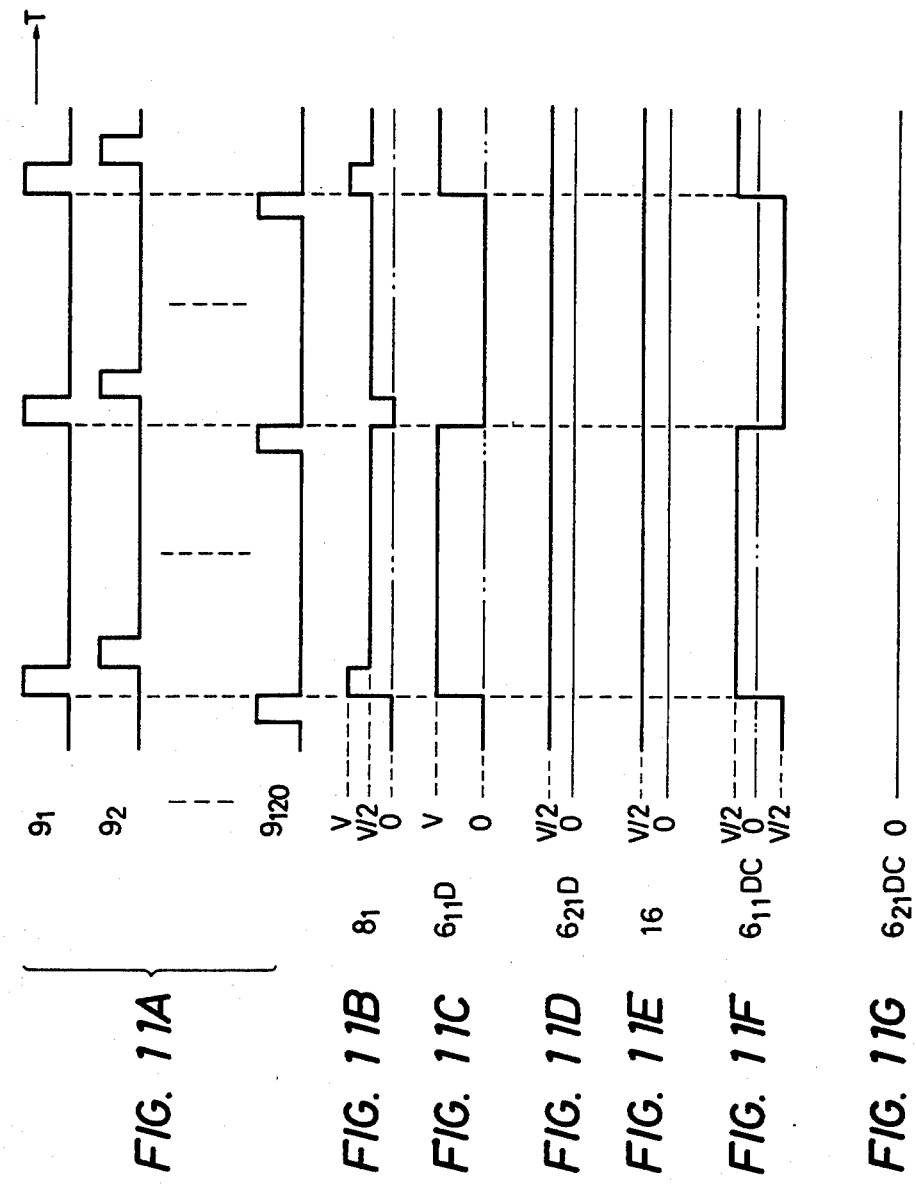

As illustrated in FIG. 11A, drive pulses successively out of phase are repeatedly applied to the gate lines $9_1$ through $9_{120}$. When a thin-film transistor $6_{11}$, for example, located where the source line $8_1$ and the gate line $9_1$ intersect is selected, a voltage V is applied to the source line $8_1$ as shown in FIG. 11B at the time the gate line $9_1$ is selected in a first cycle, and as a result the drain electrode of the thin-film transistor $6_{11}$ is charged up to the voltage V as shown at $6_{11}$D in FIG. 11C and held at that voltage. At this time, a constant voltage V/2 is applied to the source line of any element which is not selected then, e.g., the thin-film transistor $6_{21}$ located where the source line $8_1$ and the gate line $9_2$ intersect.

Therefore, the voltage at the drain of the thin-film transistor $6_{21}$ is maintained at V/2 as shown at $6_{21}$D in FIG. 11D. A voltage V/2 is applied to the common electrode 16 at all times as shown in FIG. 11E.

Consequently, the voltage V/2 is applied as a voltage $6_{11}$DC across the drain of the selected transistor $6_{11}$ and the common electrode 16 as shown in FIG. 11F, and the voltage $6_{21}$DC between the drain of the unselected transistor and the common electrode is zero as shown in FIG. 11G. When the gate line $9_1$ is selected in a next cycle, the selected source line $8_1$ is kept at zero voltage, and the drain voltage $6_{11}$D of the selected transistor $6_{11}$ is also zero. The drain voltage $6_{21}$D of the unselected transistor remains at V/2. During this cycle, therefore, the voltage $6_{11}$DC applied across the drain of the selected transistor and the common electrode becomes −V/2. The voltage between the drain of the selected transistor and the common electrode changes alternately between V/2 and −V/2, making a portion of the liquid crystal cell facing the drain electrode of the selected transistor transparent and appear through the color of the color filter attached to that transistor.

In the case where the total number of gate lines is 120 covering the gate lines $9_1$ through $9_{120}$, the total number of source lines required is three times as many as the gate lines, that is, 360. It would be a tedious and time-consuming task to lead all of these lines out of the liquid crystal display and connect them to external drivers.

According to the present invention, the peripheral circuits for driving the semiconductor driver elements are formed on the surface of the substrate on which the thin-film transistors 6R, 6G, 6B for driving the liquid crystal are fabricated. More specifically, the latch circuit 26 serving as the column driver and the shift register 29 are fabricated as integrated circuits on the substrate 12, and the gate line selector and driver circuit 32 is fabricated as an integrated circuit on the substrate, as illustrated in FIG. 5. The gate and source lines extending from the liquid crystal cell 11 are connected to these circuits 26, 29, 32 on the substrate 12, and other necessary lines are wired on the substrate 12. When the latch circuit 26, the shift register 27 and the gate line selector and driver circuit 32 are to be installed as integrated circuits on the substrate 12, they should preferably be fabricated as thin-film transistors as with the thin-film transistors constituting the color display elements. In this manner, the peripheral circuits 26, 29, 32 can be formed simultaneously with the thin-film transistors 6R, 6G, 6B on the substrate 12 without having to increase the number of fabrication steps required.

Since the thin-film transistors are relatively slow in operation speed, the amorphous-silicon films 4R, 4G, 4B should be processed with electron-beam annealing or laser annealing for a high mobility in order to increase the operation speed of the circuits 26, 29, 32. Such high-mobility processing can be performed in a relatively short period of time as the thin-film transistors constituting the color display elements need no such high-mobility processing. It is not necessary to mount all of the circuits 26, 29, 32 on the substrate 12, but only some of them, the circuits 26, 29 or the circuit 32 only, for example, may be installed on the substrate 12. The circuits 26, 29, 32 as mounted on the substrate 12 may be in the form of ordinary bipolar or monopolar integrated circuits. The amorphous-silicon thin-film transistors may be replaced with polycrystalline thin-film transistors.

With the foregoing arrangement, the peripheral circuits such as the selector and driver circuits for the semiconductor elements for driving the display elements or matrix elements in the liquid crystal cell are mounted on the substrate 12 of the latter, so that the terminals for external connection may be reduced for example to ½ of those of prior constructions thereby simplifying connection to external terminals.

Where the color filters on the semiconductor driver elements are fabricated by printing, they can be formed by a simple apparatus without requiring expensive apparatus for vapor deposition or ion doping, and also can be fabricated in the atmosphere so as to cover a relatively wide area. The color filters can reproduce colors well, can be formed inexpensively, are sufficiently thin as compared with the liquid crystal 14, and are of a sufficient color density. It is easy to attach color filters such as of red, green and blue in an alternate pattern. No ink can find its way from the color filters into the liquid crystal 14 because of the orientation treatment layer 17 of polyvinyl alcohol which is stable with respect to the liquid crystal 14. Therefore, the liquid crystal display is rendered stable in operation. Even with the color filters present, the orientation treatment layer is capable of easily control orientation of molecules of the liquid crystal 14. Instead of being prepared by way of screen printing, the color filters can be formed by offset printing to meet a higher accuracy requirement. Where the substrates can be made in a reduced thickness, any selected matrix elements can be seen properly as selected when looked at obliquely. This allows no color filter to be attached to the thin-film transistors, but permits color filters to be mounted on the substrate 13 (as shown in FIG. 5) in confronting relation to the drain electrodes. The substrates 12, 13 may be formed of high polymers such as polyimide or fluorine plastics. While the color display elements have been shown as being arranged in columns and rows for different colors, they may be arranged in circles such that any three adjacent display elements will contain red, green and blue display elements. Instead of using the additive primaries, subtractive primaries may be employed for color display.

The thin-film transistors 6R, 6G, 6B in FIGS. 5 and 6 may be constructed as illustrated in FIGS. 3 and 4. The present invention is applicable not only to color liquid crystal displays, but also to black-and-white liquid crystal displays.

Figure 12:
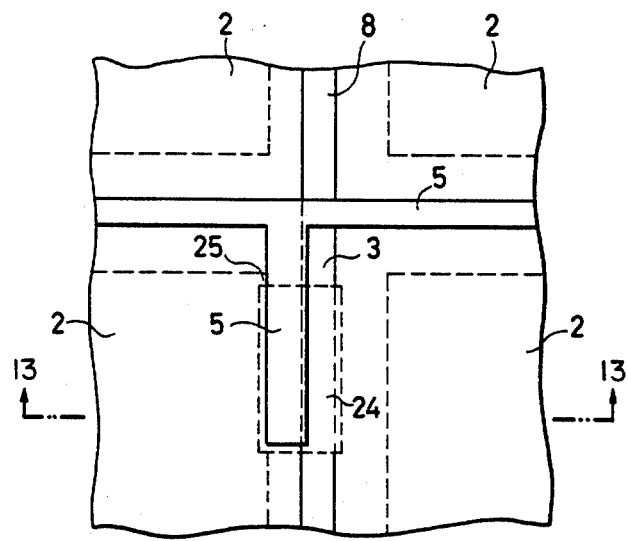
FIG. 12 is a fragmentary plan view of a thin-film transistor in a liquid crystal display according to the present invention.
Figure 13:
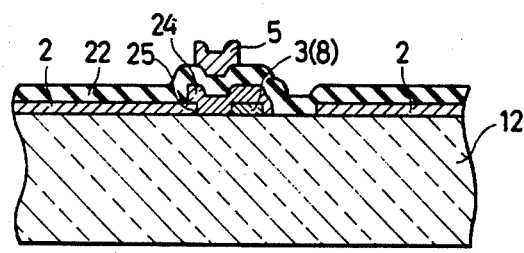
FIG. 13 is a cross-sectional view taken along line 13—13 of FIG. 2.

Such a black-and-white liquid crystal display will be described with reference to FIGS. 12 and 13. Matrix elements 2, drain electrodes 25, and source electrodes (source lines 8) 3 are formed on a substrate 12. Each of the square-shaped matrix elements 2 has a side which partly doubles as one of the drain electrodes 25. These matrix elements 2, the drain electrodes 25, the source electrodes 3, and the source lines 8 can simultaneously be formed by selectively etching a transparent metal layer deposited on the entire surface of the substrate 12. The source electrodes 3 may be made of an opaque metal.

A semiconductor layer 24 such as of amorphous silicon is formed on the substrate 12 between the drain electrode 25 and the source electrode 3. The semiconductor layer 24 may be made of polycrystalline silicon, monocrystalline silicon, tellurium, cadmium sulfide, or cadmium selenide. A gate insulation film 22 is formed on the entire surface including the semiconductor layers 24. The gate insulation film 22 may be formed of silicon nitride or silicon dioxide. The gate insulation film 22 may be formed only on the semiconductor layers 24. Gate electrodes (gate lines 9) 5 are formed on the gate insulation film 22. The gate electrodes are disposed in confronting relation to the drain electrodes 25 and the source electrodes 3 with the semiconductor layer 24 and the gate insulation film 22 interposed therebetween. The gate electrodes 5 and the gate lines 9 may be made of aluminum or polycrystalline silicon, and may be in the form of a transparent electrically conductive film.

Figure 14:
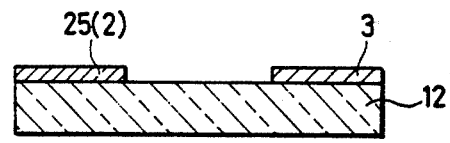
FIGS. 14 through 19 are cross-sectional views showing a process for fabricating a thin-film transistor according to the present invention.

A process of fabricating the thin-film transistor which is applicable to the various embodiments of the invention already discussed will be described by way of illustrative example with reference to FIGS. 14 through 19. As shown in FIG. 14, an opaque layer of a metal such as Nichrome, chromium, or molybdenum is deposited as a layer having a thickness on the order of 1,000–2,000 Å on a transparent insulated substrate 12 such as of glass by way of vapor deposition or sputtering, and matrix elements, drain electrodes 25 (2) and source electrodes 3 are formed by photoetching.

Figure 15:
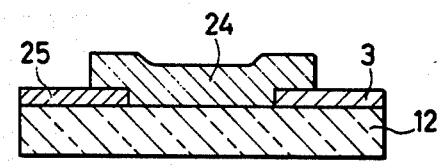

A semiconductor layer of amorphous silicon or polycrystalline silicon is formed in a thickness of 3,000 Å, for instance, on the transparent substrate 12 over the drain electrodes 25 and the source electrodes 3 through a plasma CVD (Chemical Vapor Deposition) process. The semiconductor layer is then subjected to photoetching to form a semiconductor silicon layer 24 or channel region extending between and deposited on edges of the drain and source electrodes 25, 3, as illustrated in FIG. 15.

Figure 16:
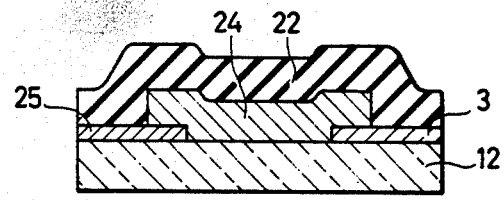

Then, a gate insulation film 22 is deposited on the transparent substrate 12 fully over the semiconductor silicon layer 24, as shown in FIG. 16. The gate insulation film 22 may be made of silicon nitride or silicon dioxide and have a thickness in the range of from 2,000 to 3,000 Å. The gate insulation film 22 can be formed by plasma CVD.

Figure 17:
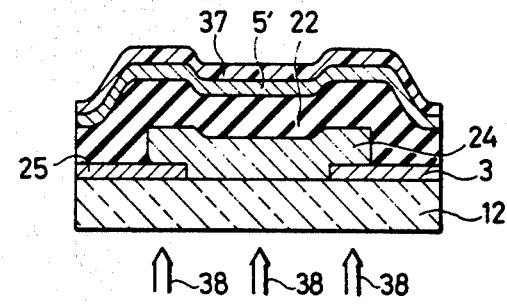
Figure 18:
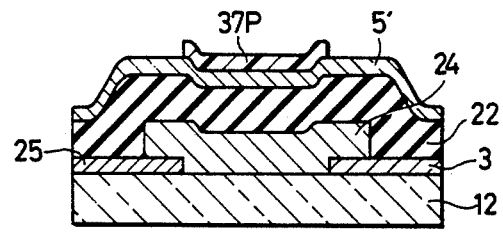

As shown in FIG. 17, a transparent electrode 5' of ITO (a mixture of $In_2O_3$ and $SnO_2$) or tin oxide is formed on the gate insulation film 22 by vapor deposition or sputtering, the transparent electrode 5' having a thickness of 1,000 Å or less, for example in the range of from 400 to 500 Å. Then, a negative-type photosensitive resin layer 37 is formed on the transparent electrode 5'. The photosensitive resin layer 37 is exposed to an ultraviolet beam 39 radiated through the transparent substrate 12.

Portions of the photosensitive resin layer 37 which are exposed to the ultraviolet beam are hardened. Through development, a pattern 37p of the photosensitive resin layer is shaped by the drain and source electrodes 25, 3 which have served as masks.

Figure 19:
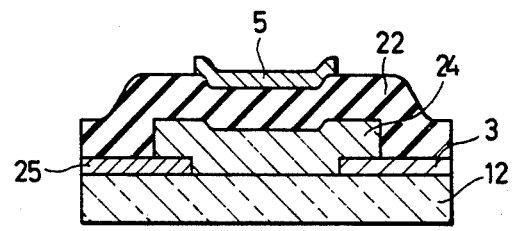

With the photosensitive layer pattern 37p used as a mask, the transparent electrode 5' is etched into a transparent gate electrode 5 and the mask pattern 37p is removed as shown in FIG. 19.

Accordingly, the matrix element electrode 2 and the drain electrode 25 are simultaneously formed and are not interconnected through any contact holes. Since no contact holes are required there is no requirement for a step of forming contact holes such as the holes 23 in the prior arrangement as shown in FIG. 4. Where the source electrode 5 is to be formed as a transparent electrode, it can be formed at the same time that the matrix element electrode 2 is formed, with the result that the number of fabrication steps can be reduced as compared with the conventional fabrication steps required to form the structure illustrated in FIGS. 3 and 4. Therefore, with the liquid crystal display of the present invention, the array of thin-film transistors can be fabricated with fewer steps than in prior fabrication techniques, so that matrix elements of uniform characteristics free from deficiencies can relatively easily be formed for a wide display area.

Since the semiconductor layer 24 is sandwiched between the substrate 12 and the gate insulation film 22, the semiconductor layer 24 is prevented from being exposed after the thin-film transistor array has been formed and before it is assembled into the liquid crystal cell 11. The semiconductor layer 24 therefore does not tend to become unstable in characteristics and there is no need for a protective layer covering the semiconductor layer 24. This allows liquid crystal cells to be fabricated with a much higher yield.

Where the liquid crystal display of the invention is employed as a transmission-type liquid crystal display, an opaque film such as of aluminum or black ink is formed on an outer surface of the substrate 12 in confronting relation to the semiconductor layer 24 between the drain and source electrodes 25, 3 to protect against any unwanted light-induced influences such as changes in the resistance of the semiconductor layer 24 where the latter is made of amorphous silicon.

The gate electrode 5 can be positioned for self alignment by way of exposure and development thereof with the drain and source electrodes 25, 3 serving as masks. The drain and source electrodes 25, 3 and the gate electrode 5 can be held in a constant relative positional phase at all times. This can reduce the distance, that is, a so-called channel length L, between the drain and source electrodes 25, 3. Therefore, there can easily be fabricated a thin-film transistor having a short turn-off time and a large drain current. Such thin-film transistors can be formed as a matrix array covering a large area with a high degree of integration while reducing variations in characteristics of such transistors.

Figure 20:
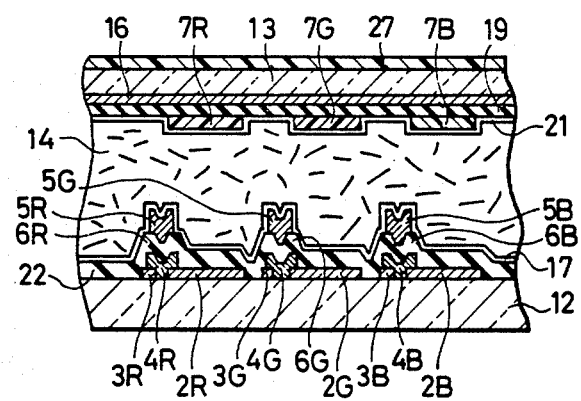
FIG. 20 is a fragmentary cross-sectional view of a liquid crystal display according to another embodiment of the present invention.

In FIG. 8, the color filters 7R, 7G, 7B are formed on the gate insulation film 22 in confronting relation to the matrix element electrodes 2R, 2G, 2B with the gate insulation film 22 interposed therebetween. However, the color filters 7R, 7G, 7B may be formed on the common electrode 19 on the substrate 13 as shown in FIG. 20. (Like or corresponding parts in FIG. 20 are denoted by like or corresponding reference characters in FIG. 8.) The color filters 7R, 7G, 7B are positioned in overlapping relation to the matrix element electrodes 2R, 2G, 2B, respectively, in a direction normal to the substrates 12, 13. The color filters 7R, 7G, 7B can easily be formed as by printing on the substrate 13 on which no thin-film transistors 6R, 6G, 6B are fabricated.

Although certain preferred embodiments have been shown and described, it should be understood that many changes and modifications may be made therein without departing from the scope of the appended claims.

What is claimed is:

1. A dot-matrix liquid crystal display comprising:
   a first transparent substrate fabricated of an insulating material;
   a second transparent substrate fabricated of an insulating material disposed closely adjacent and parallel to said first substrate and having marginal edges sealed to said first substrate to form a cell;
   a liquid crystal sealed in said cell;

a common electrode deposited substantially entirely on an inner surface of said second substrate to define a display area of said liquid crystal display;

a plurality of transparent matrix element electrodes formed in rows and columns directly on said first substrate to define display elements of a dot-matrix within said display area;

a plurality of transparent row electrode lines formed in rows directly on said first substrate to extend along the respective rows of said matrix element electrodes;

element drive thin-film transistors arranged in rows and columns on said first substrate within said display area, each of said thin-film transistors having a transparent source electrode formed directly on said first substrate integrally with a corresponding one of said row electrode lines, a transparent drain electrode formed directly on said first substrate integrally with a corresponding one of said matrix element electrodes, said source and drain electrodes being closely adjacent to one another, an amorphous silicon semiconductor layer formed on said first substrate to extend between and overlap said closely adjacent source and drain electrodes, a gate insulation film formed to cover said semiconductor layer, and a gate electrode formed on said gate insulation film in spaced facing relation to said semiconductor layer, said gate insulation film substantially entirely covering said display area; and column electrode lines formed integrally with the corresponding columns of said gate electrodes on said gate insulation film in a direction perpendicular to said row electrode lines.

2. The dot-matrix liquid crystal display of claim 1 wherein said first substrate is larger than said second substrate to define a marginal substrate portion, driver circuit means on said marginal substrate portion, said driver circuit means comprising a semiconductor integrated circuit for selectively activating said element drive thin-film transistors, said driver circuit means being connected to respective ones of said element drive thin-film transistors via connection lines formed integrally with said row and column electrode lines.

3. The dot-matrix liquid crystal display of claim 2 wherein said driver circuit means comprises a column drive integrated circuit and a row drive integrated circuit for activating the said element drive thin-film transistors which are located at the points where selected columns and rows cross one another.

4. The dot-matrix liquid crystal display of claim 3 wherein said row and column drive integrated circuits comprise thin-film transistors having the same structure as said element drive thin-film transistors and being formed simultaneously therewith.

5. The dot-matrix liquid crystal display of claim 1 wherein each of said matrix element electrodes is composed of a set of separate color element electrodes, said element drive thin-film transistors being provided for each of said color element electrodes and being connected thereto, and color filters of different colors formed on said gate insulation film in facing relation to said color element electrodes of each set.

6. The dot-matrix liquid crystal display of claim 1 wherein each of said matrix element electrodes is composed of a set of separate color element electrodes, said element drive thin-film transistors being provided for each of said color element electrodes and being connected thereto, and color filters of different colors formed on said common electrode in facing relation to said color element electrodes of each set.

7. The dot-matrix crystal display of claim 5 or 6 wherein said color filters are formed by printing.

8. A dot-matrix liquid crystal display comprising:

a first transparent substrate fabricated of an insulating material;

a second transparent substrate fabricated of an insulating material disposed closely adjacent and parallel to said first substrate and having marginal edges sealed to said first substrate to form a cell;

a liquid crystal sealed between said first and second substrates;

a common electrode deposited substantially entirely on an inner surface of said second substrate to define a display area of said liquid crystal display;

a plurality of transparent matrix element electrodes formed in rows and columns directly on said first substrate to define display elements within said display area;

a plurality of row electrode lines formed on said first substrate to extend along the respective rows of said matrix element electrodes;

and element drive thin-film transistors arranged in rows and columns, each of said thin film transistors having a metallic source electrode formed directly on said first substrate and connected to a corresponding one of said row electrode lines, a metallic drain electrode formed directly on said first substrate closely adjacent to said source electrode and connected to a corresponding one of said matrix element electrodes, a semiconductor layer formed on said first substrate to extend between and overlap corresponding ones of said closely adjacent metallic source and drain electrodes, a gate insulation film formed to cover a corresponding portion of said semiconductor layer, and a transparent gate electrode formed on a corresponding portion of said gate insulation film and connected to column electrode lines which extend in a direction perpendicular to said row electrode lines, said gate insulation films being formed as a continuous film extending over substantially all of said display area to cover said semiconductor layers and said matrix element electrodes, and each of said transparent gate electrodes having a width substantially equal to the space between the edges of corresponding ones of said closely adjacent source and drain electrodes and being positioned above and in overlying relation to said space in alignment therewith.

9. The dot-matrix liquid crystal display of claim 8 wherein each of said matrix element electrodes is composed of a set of separate color element electrodes, said element drive thin-film transistors being provided for each of said color element electrodes and connected thereto, and color filters of different colors formed on said gate insulation film in facing relation to said color element electrodes of each set.

10. The dot-matrix liquid crystal display of claim 8 wherein each of said matrix element electrodes is composed of a set of separate color element electrodes, said element drive thin-film transistors being provided for each of said color element electrodes and connected thereto, and color filters of different colors formed on said common electrode in facing relation to said color element electrodes of each set.

11. The dot-matrix liquid crystal display of claim 8, 9 or 10, wherein integrated driver circuit means is formed on a marginal portion of said first substrate outside of the region in which said liquid crystal is sealed, said integrated driver circuit means comprising thin-film transistors having a structure similar to that of said element drive thin-film transistors and being formed simultaneously therewith, said integrated driver circuit means being operative to selectively activate said element drive thin-film transistors and being connected to respective ones of said element drive thin-film transistors via connection lines formed integrally with said row and column electrode lines.

12. The dot-matrix liquid crystal display of claim 8, 9 or 10, wherein said column electrode lines connected to respective said gate electrodes are formed on said gate insulation film.

* * * * *